United States Patent
Garney et al.

(10) Patent No.: US 6,629,186 B1
(45) Date of Patent: *Sep. 30, 2003

(54) BUS CONTROLLER AND ASSOCIATED DEVICE DRIVERS FOR USE TO CONTROL A PERIPHERAL BUS HAVING AT LEAST ONE STORE-AND-FORWARD SEGMENT

(75) Inventors: John I. Garney, Portland, OR (US);
John S. Howard, Portland, OR (US);
Venkat Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,088

(22) Filed: May 10, 1999

(51) Int. Cl.⁷ .............................................. G06F 13/12
(52) U.S. Cl. ......................... 710/310; 710/305; 710/22
(58) Field of Search ................................ 710/305, 310, 710/22

(56) References Cited

U.S. PATENT DOCUMENTS

| | | | |
|---|---|---|---|
| 5,448,591 A | * | 9/1995 | Goodrich .................... 375/257 |
| 5,615,406 A | | 3/1997 | Sasaki et al. |
| 5,621,901 A | | 4/1997 | Morriss et al. |
| 5,623,610 A | | 4/1997 | Knoll et al. |
| 5,694,555 A | | 12/1997 | Morriss et al. |
| 5,742,847 A | | 4/1998 | Knoll et al. |
| 5,890,015 A | | 3/1999 | Garney et al. |
| 5,909,556 A | | 6/1999 | Morriss et al. |
| 6,389,501 B1 | * | 5/2002 | Garney et al. ............... 710/310 |
| 6,412,028 B1 | * | 6/2002 | Steed et al. .................... 710/22 |

* cited by examiner

Primary Examiner—Sumati Lefkowitz
Assistant Examiner—Tim Vo
(74) Attorney, Agent, or Firm—Blakely, Sokoloff, Taylor & Zafman LLP

(57) ABSTRACT

A bus controller and its associated device drivers are provided to a digital system to operate and control a peripheral bus, including the selective operation of at least a first portion of the peripheral bus in a store-and-forward manner. The device drivers include a number of programming instructions. Upon programmed with the programming instructions, a digital system is enabled to operate the bus controller to facilitate communication with a first bus agent in this first portion. The programming instructions package a number of request packets destined for the first bus agent into a multi-packet package, schedule the multi-packet package to be transmitted in bulk, at a first communication speed, to a first hub in the first portion, for the first hub to buffer the request packets, and then forward the request packets to the first bus agent, on a packet-by-packet basis and at a second communication speed. In one embodiment, the second communication speed is slower than the first communication speed. In one embodiment, the programming instructions further schedule communications destined for a second bus agent of this first portion, for transmission to the first hub, at the first communication speed, for the first hub to repeat the communications for the second bus agent without buffering, at also the first communication speed.

29 Claims, 7 Drawing Sheets

BUS CONTROLLER AND ASSOCIATED DEVICE DRIVERS FOR USE TO CONTROL A PERIPHERAL BUS HAVING AT LEAST ONE STORE-AND-FORWARD SEGMENT

BACKGROUND OF THE INVENTION

1. Field of the Invention

The present invention relates to the field of digital systems. More specifically, the present invention relates to the bus controllers of peripheral buses, including their associated device drivers.

2. Background Information

With the advances in microprocessor technology, today's personal computers possess computing power that rivals the capabilities of mainframe computers of past years. The advances had also led to increasing number of electronic appliances, such as set-top box, and other entertainment systems. Increasingly, these computers and electronic appliances are used for multi-media applications, involving isochronous data, such as audio and video. Together, these isochronous data impose a large aggregate bandwidth requirement on the peripheral bus, to which the isochronous peripheral devices are attached. Examples of isochronous devices include cameras, speakers, microphones, scanners, and so forth.

A number of peripheral bus technologies are known in the art. Universal Serial Bus (USB) is an hierarchical serial bus technology developed in recent years to provide a low cost and easy-to-use solution to meet multi-media application bandwidth requirement. To achieve the low cost and easy-to-use objectives, USB supports only a "full speed" signaling rate of 12 Mb/s and a "low speed" signaling rate of 1.5 Mb/s. To accommodate the "low speed" devices on the peripheral bus, speed shifting is performed on a packet boundary basis when alternating between the "full speed" and the "low speed" devices. Experience has shown that this is a significant performance burden to the "full speed" devices, and a waste of bandwidth. Moreover, recent experience has further shown that even greater bandwidth is required to support the ever increasing number and varieties of isochronous peripheral devices users are interested in.

Another popular peripheral bus technology is the Firewire or IEEE 1394 serial bus technology (IEEE 1394, High Performance Serial Bus, 1995). 1394 supports multiple signaling rates, up to 400 Mb/s. While the aggregate bandwidth is substantially higher than USB, 1394 is fundamentally a more costly technology. Moreover, it too employs the above mentioned wasteful speed shifting approach to accommodate the slower speed devices.

Thus, an improved approach to provide the desired increase in bandwidth, yet backward compatible to some of the lower cost solutions, such as USB, and unencumbered by the disadvantages of the prior art, is desired.

SUMMARY OF THE INVENTION

A novel bus controller including its device drivers are disclosed. The device drivers include a number of programming instructions. Upon programmed with the programming instructions, a digital system is enabled to operate the bus controller to provide a number of request packets destined for a bus agent to a hub, in an integrated multi-packet form, in bulk, and at a first communication speed, for the hub to buffer and forward the request packets to the bus agent, on a packet-by-packet basis, at a second communication speed.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as device drivers, bus controllers, hubs, bus agents and so forth. Also, parts of the description will also be presented in terms of operations performed through the execution of programming instructions, using terms such as processing, packaging, scheduling, transmitting, configuring, and so on. As well understood by those skilled in the art, these operations take the form of electrical, magnetic, or optical signals capable of being stored, transferred, combined, and otherwise manipulated through electrical components.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A Basic Store and Forward Peripheral Bus

Figure 1:
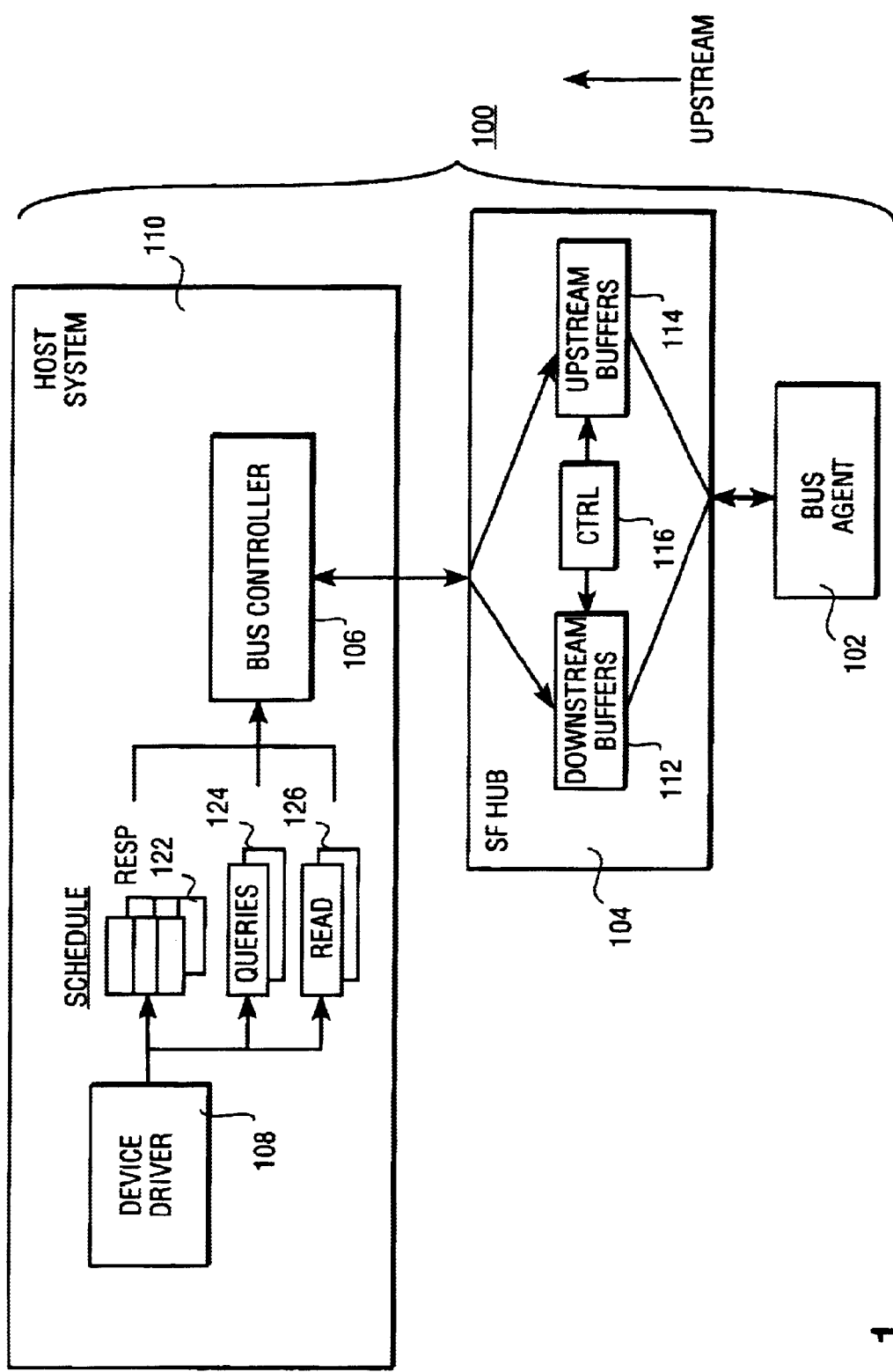
FIG. 1 illustrates the store-and-forward peripheral bus of the present invention, in accordance with one embodiment.

Referring now to FIG. 1, wherein a block diagram illustrating the store-and-forward peripheral bus of the present invention, in accordance with a basic embodiment, is shown. As illustrated, similar to serial buses known in the art, peripheral bus 100 includes bus agent 102 coupled upstream to store-and-forward (SF) hub 104, which in turn is coupled upstream to bus controller 106. For the illustrated embodiment, bus controller 106 is installed on host system 110 and has associated device driver 108 that executes on host system 110. However, unlike prior art serial buses, SF hub 104 is not simply constituted with circuitry that repeats the signals it receives on its upstream side on its downstream ports, and vice versa, SF hub 104 includes a number of downstream buffers 112 and a number of upstream buffers 114, controlled by control circuitry 116. Bus agent 102 and SF hub 104 communicate in one communication speed, while SF hub 104 and bus controller 106 communicate in another communication speed. SF Hub 104 bridges the communications conducted in different communication speeds without requiring speed shifting in between transactions with other peripheral devices operating in yet other communication speeds.

For ease of understanding, the remaining description will primarily be presented in the context of bus agent 102 and SF hub 104 communicating at a speed that is higher than the communication speed between SF hub 104 and bus controller 106. However, from the description to follow, those skilled in the art will appreciate that the present invention may be practiced to bridge a slower communication speed to a higher communication speed instead, or even equal communication speed but different protocols.

Still referring to FIG. 1, to facilitate communications or transactions between host system 110 (e.g. on behalf of an application executing on host system 110) and bus agent 102, device driver 108 processes a number of the request packets destined for bus agent 102 into an integrated multi-packet package 122, and schedules the integrated multi-packet package 122 for transmission by bus controller 106, in bulk, to bus agent 102, by way of SF hub 104. The request packets may be of different request types, e.g. read as well as write, with different packet type information included in them. In response, bus controller 106 transmits the package 122 to SF hub 104, in bulk, using the faster communication speed, for SF hub 104 to buffer in downstream buffers 112. (Note that in the context of this transmission, package 122 itself is a packet, except its contents are "bundled" packets, and that fact is transparent to bus controller 106). In turn, control circuitry 116 causes the request packets to be forwarded to bus agent 102, on a packet-by-packet basis, using the slower communication speed.

Bus agent 102 in due course provides its responses, if applicable (e.g. in the case of a read request), to SF hub 104, in the form of one or more response packets. Each of the response packets is also provided in the slower communication speed with which bus agent 102 operates. SF hub 104 buffers the response packets in upstream buffers 114. In turn, control circuitry 116 causes the response packets to be returned to bus controller 106, in bulk, using the faster communication speed, upon accumulating some or all the response packets due.

Note that while for ease of explanation, only one bus agent 102 is shown for peripheral bus 100, as those skilled in the art will appreciate that typically multiple bus agents 102 are present in peripheral bus 100. With the inclusion of proper addressing information, package 122 may include request packets destined for different bus agents 102.

For the illustrated embodiment, when scheduling a package 122 for transmission, device driver 108 also schedules a query 124 for transmission by bus controller 106 to SF hub 104 sometime in a predetermined future, to query SF hub 104 on whether certain amount of response packets to the package 122 have been accumulated. Control circuitry 116 signals bus controller 106 accordingly, depending on whether the inquired amount of response packets have been accumulated. If the inquired amount of response packets have not been all received, device driver 108 reschedules another query 124 for transmission by bus controller 106 in another predetermined time in the future. The process continues until eventually at some point in time, the inquired amount of response packets would have been accumulated. At such time, SF hub 104 responds to the query by returning the accumulated response packets in bulk, using the faster communication speed.

Thus, under the present invention, as alluded to earlier, the lower communication speed of bus agent 102 is bridged, eliminating the need for speed shifting to accommodate the lower communication speed of bus agent 102, when switching from transactions with another peripheral device that is capable of operating at the higher communication speed.

Figure 2:
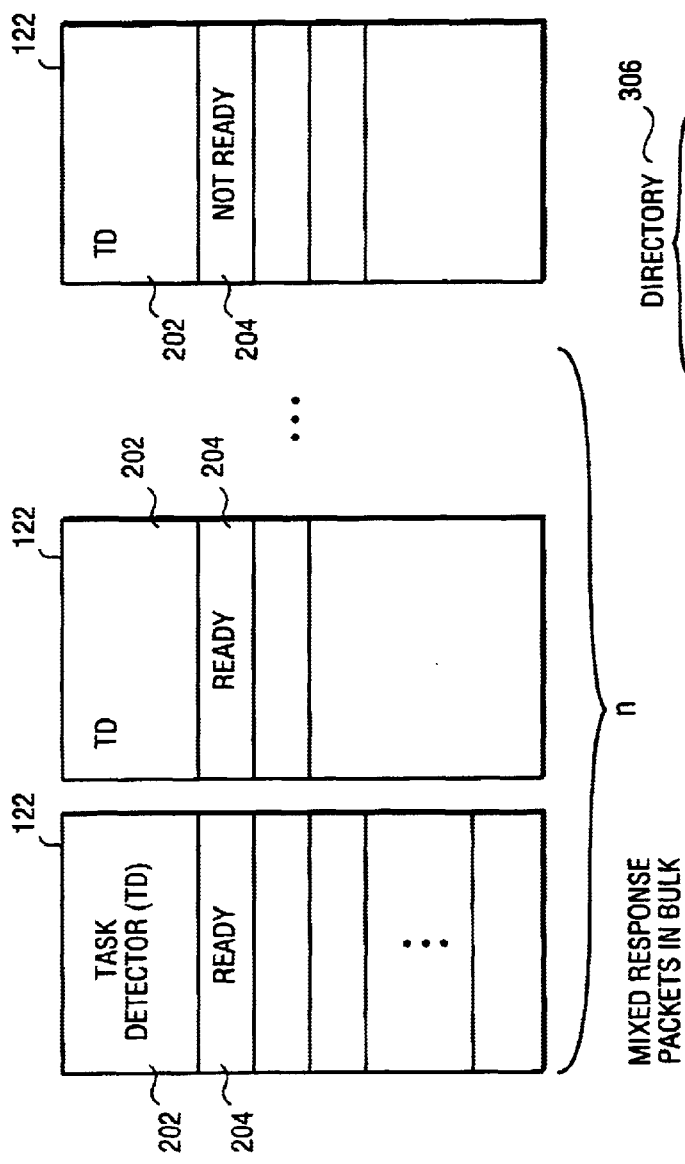
FIG. 2 illustrates the employment of task status fields to self-regulate the amount of request packets transmitted to a store-and-forward hub.

Referring now also to FIG. 2, for the illustrated embodiment, device driver 108 also advantageously operates bus controller 106 in a self-regulated manner, such that the number of request packets transmitted to SF hub 104 to buffer will not overflow downstream buffers 112. In particular, device driver 108 employs task status field 204, disposed in task descriptor 202 of each package 122, to effectuate the self-regulation. For the first n packages, device driver 108 schedules packages 122 with their task status fields 204 set to "ready", indicating their readiness for bus controller 106 to act on, as soon as bus controller 106 is free to do so. Thereafter, device driver 108 schedules packages 122 with their task status fields 204 set to "not ready", thereby preventing bus controller 106 to act on them, even if bus controller 106 is free to do so. Bus controller 106 subsequently updates these task status fields 204 to "ready", when responses to earlier transmitted requests are received, implying the availability of previously occupied buffer slots of downstream buffers 112.

The size n is application dependent. It might be conservatively set without knowledge of the size of downstream buffers 112. Alternatively, it may be set in proportion to the size of downstream buffers 112, which may be made known to device driver 108 in a priori manner, or dynamically at configuration time, when SF hub 104 is first attached to bus controller 106.

Figure 3:
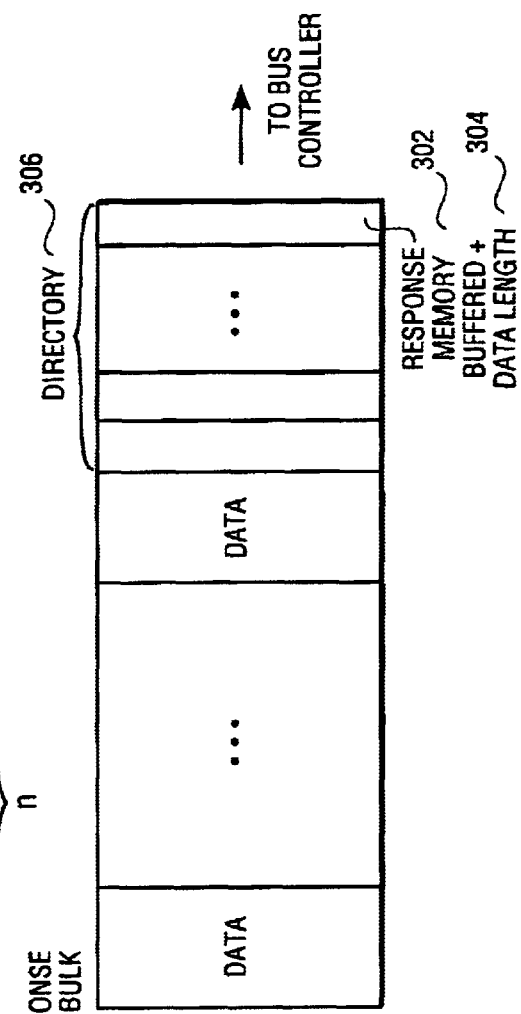
FIG. 3 illustrates the employment of response memory buffer identifiers to streamline receipt of responses from the store-and-forward hub.

Referring now to FIG. 1 and FIG. 3, in an alternate embodiment where multiple bus agents 102 are present, device driver 108 and control circuitry 116 also advantageously employ response memory buffer identifier 302 to assist in the return of responses to requests destined for different bus agents, to streamline the response receive operation. More specifically, device driver 108 associates with each request destined for a different bus agent, a response memory buffer identifier 302 to identify the ultimate system memory locations where the response data of the bus agent are to be stored. When returning the response packets of the different bus agents in a "mixed" bulk, control circuitry 116 includes the appropriate response memory buffer identifier 302, along with the size of each piece of the response data 304, in directory 306, disposed at the beginning of the bulk transmission. Upon receipt of mixed response data, bus controller 106 decodes the response memory buffer identifier 302, and stores the next m bytes of data specified by the associated size indicator 304 to the identified system memory locations. Bus controller 106 repeats this process for all entries included in directory 306. Thus, response memory buffer identifier 302 and the sizes of the different pieces of response data enable the response data of different bus agents to be mixed, and yet directly copied into the ultimate appropriate system memory locations, thereby eliminating the need of temporary receive buffers for the different bus agents, and the additional copy operations otherwise will be necessary to copy the response data from the temporary receive buffers to their ultimate system memory locations. Furthermore, for the illustrated embodiment, the mixing of response data from different bus agents are selectively employed. Control circuitry 116 pre-transmits a notification packet or a token (not shown) to bus controller 106, alerting bus controller 106 of the mixed nature of the next bulk transmission, whenever response data of different bus agents are included.

Continuing to refer to FIG. 1, in some embodiments, where the two communication speeds have an integer multiple relationship to one another, SF Hub 104 further uses the integer multiple relationship to synchronize the frame clocks of the two communication speeds when transmitting isochronous data, to avoid drifting and ensure high quality. For example, in one instance, SF Hub 104 derives the frame clock for the lower communication speed having a 1 ms frame for isochronous data from 8 data frames of the higher communication speed using 125 us frame for isochronous data.

As alluded to earlier, the above described advantageous manner of operation is substantially transparent to bus controller 106. That is, from the perspective of bus controller 106, it is merely transmitting a block of data at a speed it is electrically designed to operate. Therefore, except for the recognition of the task "readiness" status field and the streamlined direct storage operation, bus controller 106 may be implemented in any one of a number of conventional manners known in the art, as long as it can support the desired high speed of operation. As to the recognition of the task "readiness" status field and the streamlined direct storage operation, they may be implemented with any one of a number of combinatorial logic, and data paths to the system memory bus. Similarly, except for the teachings of the present invention, device driver 108 may otherwise be implemented in any one of a number of conventional manners known in the art. While for ease of understanding, device driver 108 is referred to in singular form, as those skilled in the art will also appreciate that it may be implemented in one or more modules.

Downstream and upstream buffers 112–114 may be implemented using any storage circuitry known in the art. Moreover, downstream and upstream buffers 112–114 may be further organized into different groups to facilitate different combination of speed/protocol bridging. Control circuitry 116 may be implemented using any combinatorial logic known in the art. Any one of a number of known techniques may be employed by SF hub 112 (or in conjunction with bus agent 102) to track and associate the response data to the requests, including association of the response memory buffer identifiers.

Bus agent 102 is intended to represent a broad range of peripheral devices known in the art, including but not limited to cameras, speakers, scanners, mice, joysticks, printers, monitors, and so forth. As indicated earlier, while only one bus agent is shown, the present invention may nevertheless be practiced with one or more bus agents 102. The multiple bus agents 102 may be coupled to host system 110 through one or more SF hubs 104. Furthermore, bus agent 102 may also be coupled to SF hub 104 through at least another conventional repeater type hub that operates at the above described slower communication speed. The conventional repeater type hub may in turn have one or more bus agents 102 attached to it.

Host system 110 is intended to represent a broad range of digital systems, including but not limited to laptop computers, desktop computers, servers, set-top box, entertainment systems, and so forth.

A Basic Hybrid Peridpheral Bus

Figure 4:
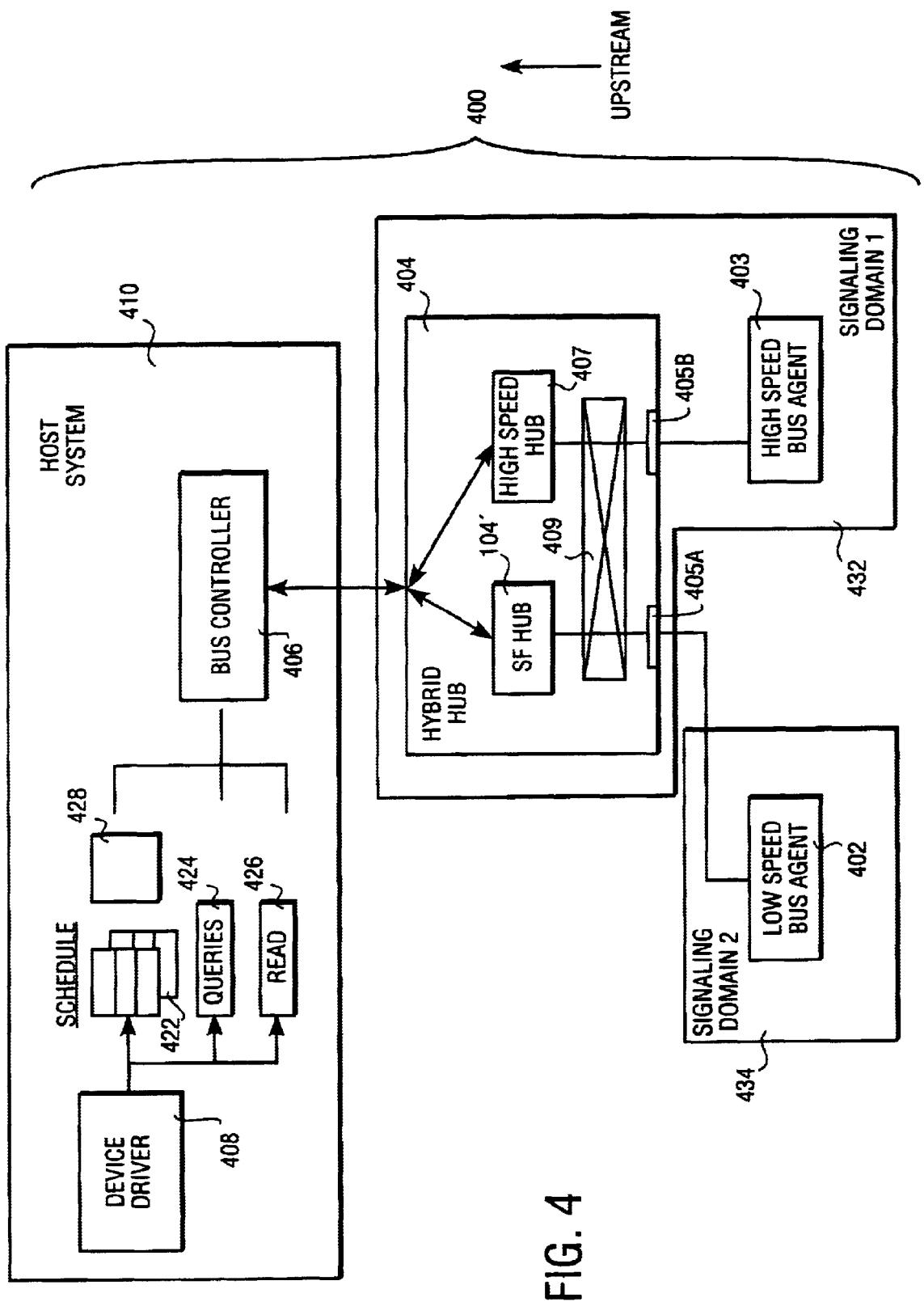
FIG. 4 illustrates a basic hybrid peripheral bus having at least one store-and-forward segment, in accordance with one embodiment.

Referring now to FIG. 4, wherein a block diagram illustrating a hybrid peripheral bus having at least one segment deployed in accordance with the store-and-forward peripheral bus of the present invention, in accordance with one embodiment, is shown. As illustrated, similar to the earlier described embodiment, hybrid peripheral bus 400 includes low speed bus agent 402 and high speed bus agent 403 coupled upstream to ports 405a and 405b of hybrid hub 404 respectively, which in turn is coupled upstream to bus controller 406. Bus controller 406 is installed on host system 410 and has associated device driver 408 that executes on host system 410. However, unlike the earlier described embodiment, hybrid hub 404 is constituted with the earlier described SF Hub 104', a conventional repeater type hub logic 407 and routing network 409, which selectively couples ports 405a and 405b to SF hub 104' and conventional repeater type hub logic 407. Conventional repeater type hub logic 407 is electrically equipped to operate at the faster communication speed. Thus, low speed bus agent 402 and hybrid hub 404 communicate in the lower communication speed, while hybrid hub 404 communicates with bus controller 406 and high speed bus agent 403 using the faster communication speed. In other words, in addition to not having speed shifting between transactions with other higher speed peripheral devices, to accommodate the fact that bus agent 402 operates with a slower communication speed, hybrid peripheral bus 400 actually operates with two signaling domains 432 and 434, with signaling domain 432 operating at the faster communication speed and signaling domain 434 operating at the slower communication speed.

To facilitate communications or transactions between host system 410 (e.g. on behalf of an application executing on host system 410) and bus agent 403, device driver 408 simply schedules transactions 428 for bus controller 406 to transmit, and conventional high speed repeater hub logic 407 to repeat (without buffering) for high speed bus agent 403. To facilitate communications or transactions between host system 410 (e.g. on behalf of an application executing on host system 410) and low speed bus agent 402, as described earlier, device driver 408 processes a number of the request packets destined for low speed bus agent 402 into a multi-packet package 422, and schedules the multi-packet package 422 for transmission by bus controller 406, in bulk, to low speed bus agent 402, by way of SF hub 104'. In response, bus controller 406 transmits the package 422 to SF hub 104', in bulk, using the faster communication speed, for SF hub 104' to buffer. In turn, SF hub 104' causes the request packets to be forwarded to low speed bus agent 402, on a packet-by-packet basis, using the slower communication speed.

High speed bus agent 403 in due course provides the response packets, if applicable, for repeater hub 407 to repeat (without buffering) for bus controller 406. Low speed bus agent 402 in due course provides the response packets, if applicable, to SF hub 104'. Each of the response packets is provided in the slower communication speed with which low speed bus agent 402 operates. SF hub 104' buffers the response packets, and in turn, causes the response packets to be returned to bus controller 406, in bulk, using the faster communication speed, upon accumulating some or all of the response packets due. Device driver 408 employs queries 424 and instructions 426 as described earlier to cause SF hub 104' to return the response packets in bulk. Additionally, for the illustrated embodiment, device driver 408 also practices the earlier described self-regulating manner of operation, and the streamlined approach to receiving responses.

Thus, for hybrid peripheral bus 400, the lower communication speed of bus agent 402 is also bridged, eliminating the need for all the bus elements to speed shift to accommodate the lower communication speed of bus agent 402, when switching from transactions with another peripheral device that is capable of operating at the higher communication speed, such as bus agent 403. Furthermore, peripheral bus 400 operates with two signaling domains 432 and 434, with one domain concurrently supporting high speed bus agent 403.

Figure 5:
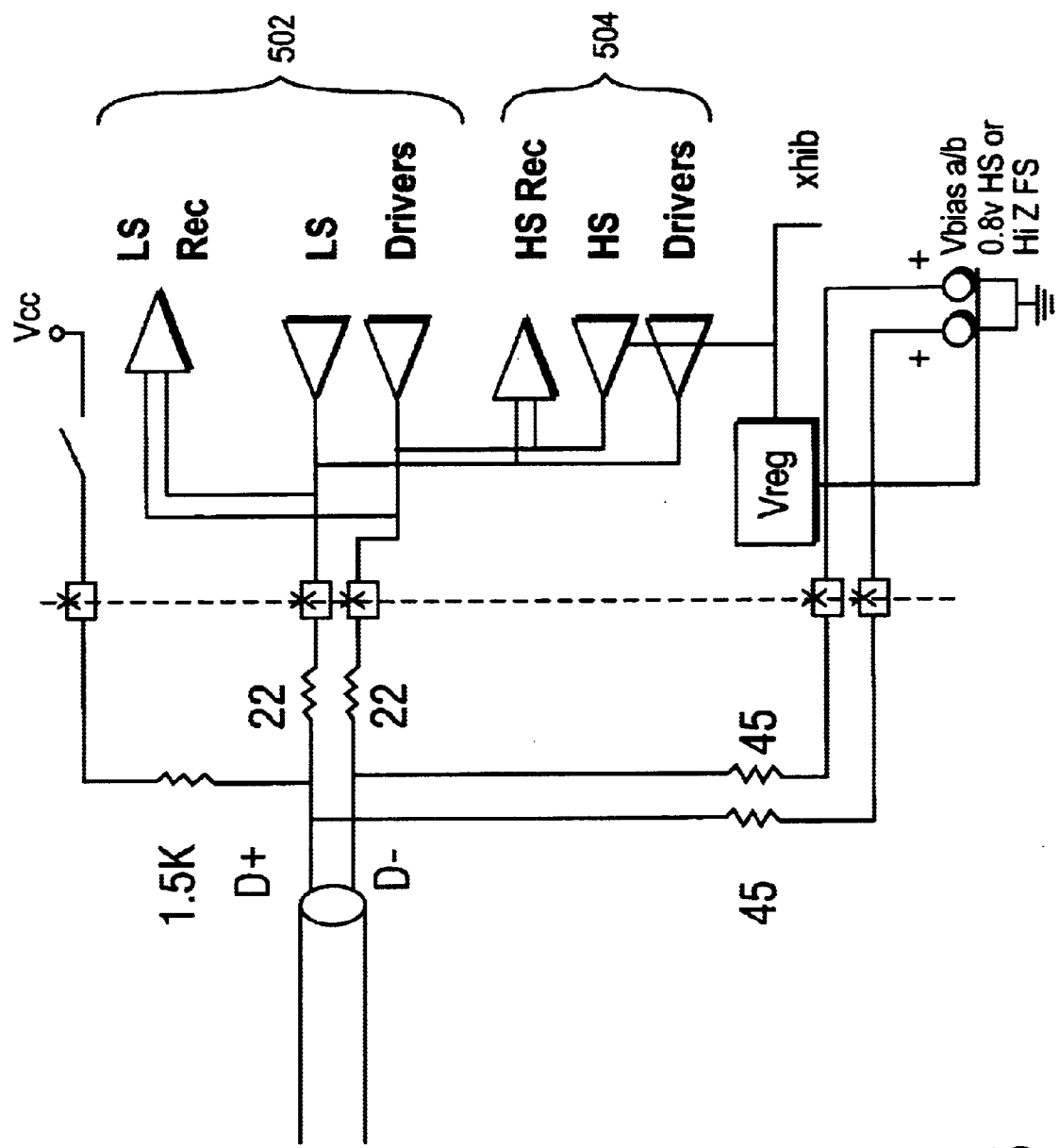
FIG. 5 illustrates the provision of serial and parallel terminations to a port, in accordance with one embodiment.

Referring now also to FIG. 5, wherein a schematic diagram illustrating the electrical terminations provided to each of ports 405a and 405b, in accordance with one embodiment, is shown. As illustrated, each of ports 405a and 405b is provided with serial termination 502 and parallel termination 504. Serial termination 502 is employed for operation in the slower communication speed, whereas parallel termination 504 is employed for operation in the faster communication speed. Each of ports 405a and 405b is configured by the control circuitry of SF hub 104' to operate with the appropriate one of the two terminations, when control circuitry of SF hub 104' ascertained the operational speed of the attached device, i.e. bus agents 402 and 403. For the illustrated embodiment, the operational speed of the attached device is ascertained at the time the device is attached to the port. The attachment of a device to the port may be detected through any one of a number of techniques known in the art, including but not limited to the employment of pull-up devices.

Figure 6:
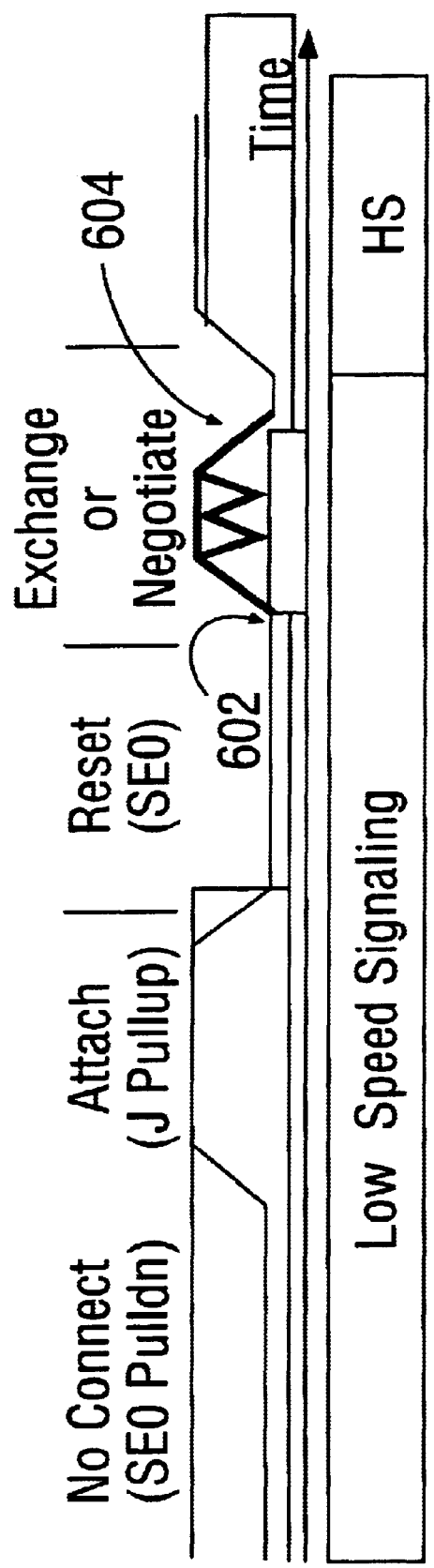
FIG. 6 illustrates a signaling scheme for determining the communication speed capability of a device, in accordance with one embodiment.

Referring now to FIG. 4 and FIG. 6 instead, wherein in FIG. 6, a signaling protocol employed by control circuitry of SF Hub 104' to determine the communication speed capability of an attached device, in accordance with one embodiment, is shown. As illustrated, as in the prior art, upon detection of the attach pull-up, port 405a/405b drives a reset for a predetermined amount of time. Control circuitry of SF hub 104' allows the bus segment to settle down. After the expiration of the reset period, the control circuitry causes a predetermined signal pattern 602 to be driven through the port to the attached device, at the slower communication speed. The attached device then responds with a predetermined response pattern 604 within a predetermined time period, also at the slower communication speed. This pattern and response may repeat multiple times with the same or different predetermined pattern-response pairs during this exchange or negotiation period. Upon successful exchange of the requisite pattern-response pairs, for the illustrated embodiment, the control circuitry of SF hub 104' infers that the attached device is a device equipped to operate at the faster communication speed. In response, the control circuitry configures port 405a/405b to employ the parallel termination. Additionally, the control circuitry configures routing network 409 to couple port 405a/405b to repeater hub 407. However, if the requisite pattern-response pairs were not exchanged successfully, the control circuitry of SF hub 104' infers that the attached device is a device equipped to operate at the slower communication speed. In response, the control circuitry configures port 405a/405b to employ the serial termination instead. Furthermore, the control circuitry configures routing network 409 to couple port 405a/405b to SF Hub 104' instead.

Continuing to refer to FIG. 4, similar to the embodiment of FIG. 1, the above described advantageous manner of hybrid operation is also substantially transparent to bus controller 406. That is, from the perspective of bus controller 406, it is merely transmitting a block of data at a speed it is electrically designed to operate, and it is indifferent to the fact whether the block of data is in the multi-packet form or not. Thus, again, except for the recognition of the task "readiness" status field and the streamlined direct storage operation, bus controller 406 may also be implemented in any one of a number of conventional manners known in the art, as long as it can support the desired high speed of operation. As to the recognition of the task "readiness" status field and the streamlined direct storage operation, as described earlier, they may be implemented with any one of a number of combinatorial logic, and data paths to the system memory bus. Similarly, except for the teachings of the present invention, device driver 408 may otherwise be implemented in any one of a number of conventional manners known in the art also. Also, while for ease of understanding, device driver 408 is referred to in singular form, as those skilled in the art will also appreciate that it may be implemented in one or more modules.

While for ease of understanding, only bus agents 402 and 403 are shown, those skilled in the art will appreciate that the present invention may be practiced with one or more hybrid hubs 404, supporting multiple levels of bus agents 402 and 403. Furthermore, the present invention may also be practiced with bus agent 402 coupled to SF hub 104' through at least one other conventional repeater type hub that operates at the slower communication speed. The conventional repeater type hub in turn may have one or more bus agents 402 attached to it. Likewise, bus agent 403 may be coupled to repeater hub 407 through at least one other repeater hub that operates at the faster communication speed. The repeater hub in turn may have one or more bus agents 403 attached to it.

Again, host system 410 is intended to represent a broad range of digital systems, including but not limited to laptop computers, desktop computers, servers, set-top box, entertainment systems, and so forth.

A More Complex Hybrid Peripheral Bus

Figure 7:
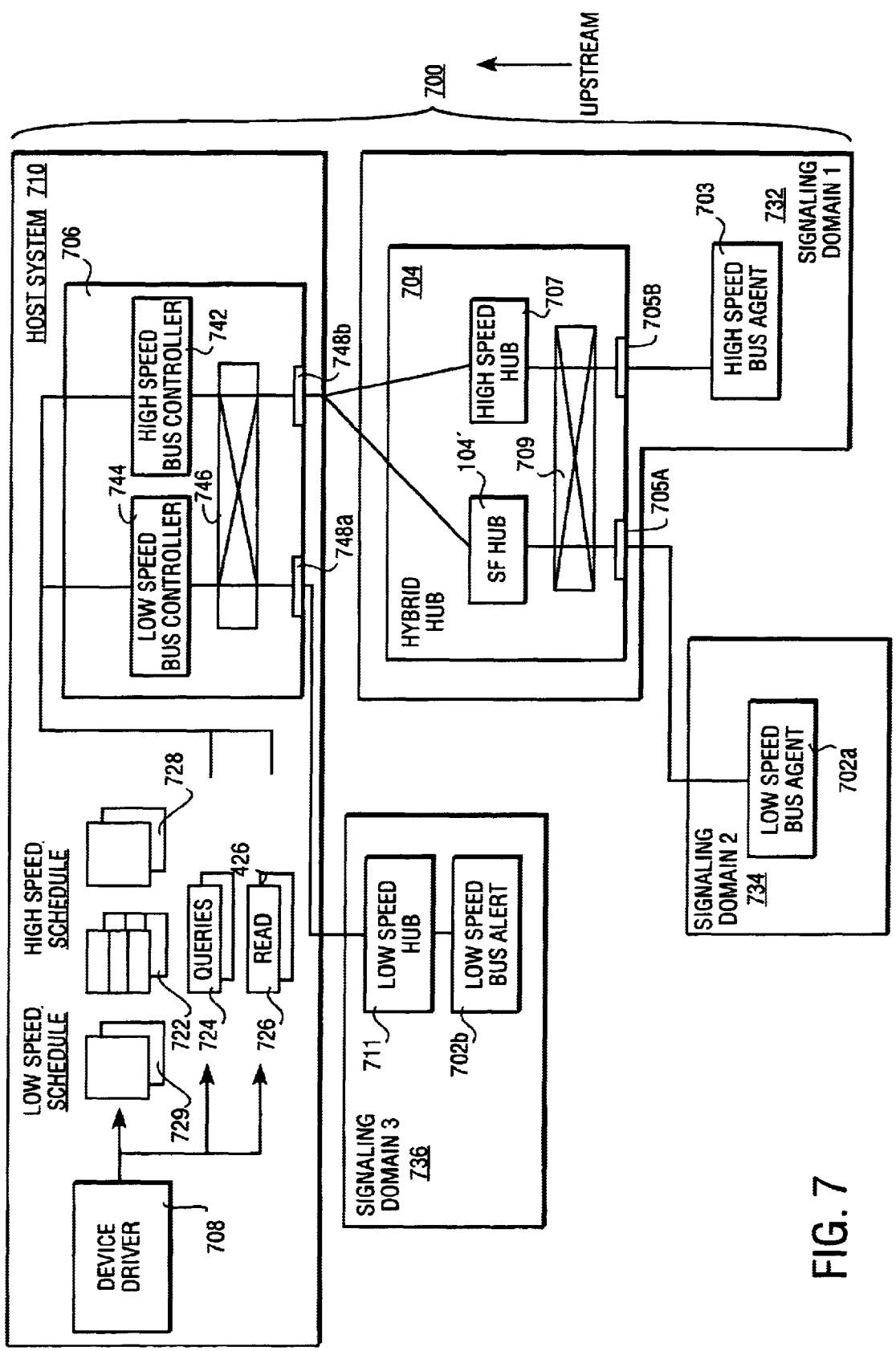
FIG. 7 illustrates a more complex hybrid peripheral bus having at least one store-and-forward segment, in accordance with one embodiment.

Referring now to FIG. 7, wherein a block diagram illustrating a more complex hybrid peripheral bus having at least one segment deployed in accordance with the store-and-forward peripheral bus of the present invention, in accordance with another embodiment, is shown. As illustrated, similar to the earlier described embodiment of FIG. 4, hybrid peripheral bus 700 includes low speed bus agent 702a and high speed bus agent 703 coupled upstream to ports 705a–705b of hybrid hub 704 respectively, which in turn is coupled upstream to bus controller 706. Bus controller 706 is installed on host system 710 and has associated device driver 708 that executes on host system 710. However, unlike the earlier described embodiment, attached also to bus controller 706 is low speed hub 711, to which low speed bus agent 702b is in turn attached.

Bus controller 706 is a hybrid bus controller including high speed bus controller 742 and low speed bus controller 744. Except for the fact that one is electrically constituted to operate in a faster communication speed, and the other is electrically constituted to operate in a slower communication speed, constitutionally and operationally, bus controllers 742 and 744 are otherwise the same, and that they are variations of bus controllers 106 and 406 of FIGS. 1 and 4 described earlier. In addition, hybrid bus controller 706 also includes routing network 746 and ports 748a and 748b. Routing network 746 selectively couples ports 748a and 748b to either high speed bus controller 742 or low speed bus controller 744. Ports 748a and 748b are also provided with the selectively configurable dual terminations of FIG. 5. High speed bus controller 742 also practices the signaling scheme in determining the communication speed capabilities of the devices attached to ports 748a–748b, and configures their terminations as well as routing network 746 accordingly.

Thus, as FIG. 4, low speed bus agent 702a and hybrid hub 704 communicate in the lower communication speed, while hybrid hub 704 communicates with hybrid bus controller 706 and high speed bus agent 703 using the faster communication speed. Additionally, low speed hub 711 also communicates with hybrid bus controller 706 and low speed bus agent 702b using the slower communication speed. In other words, hybrid peripheral bus 700 operates with three signaling domains 432, 434 and 436.

To facilitate communications or transactions between host system 710 (e.g. on behalf of an application executing on host system 710) and high speed bus agent 703, device driver 708 simply schedules transactions 728 for high speed bus controller 742 to transmit, and conventional high speed repeater hub 707 repeats (without buffering) the transmission for high speed bus agent 703. To facilitate communications or transactions between host system 710 (e.g. on behalf of an application executing on host system 710) and low speed bus agent 702b, device driver 708 employs a different schedule, and schedules transactions 729 for low speed bus controller 744 to transmit, and conventional low speed repeater hub 711 repeats (without buffering) the transmissions for low speed bus agent 702b.

To facilitate communications or transactions between host system 710 (e.g. on behalf of an application executing on host system 710) and low speed bus agent 702a, as described earlier, device driver 708 processes a number of the request packets destined for low speed bus agent 702a into a multi-packet package 722, and schedules the multi-packet package 722 for transmission by high speed bus controller 742, in bulk, to low speed bus agent 702a, by way of SF hub 104". In response, high speed bus controller 742 transmits the package 722 to SF hub 104", in bulk, using the faster communication speed, for SF hub 104" to buffer. In turn, SF hub 104" causes the request packets to be forwarded to low speed bus agent 702a, on a packet-by-packet basis, using the slower communication speed.

High speed bus agent 703 in due course provides the response packets, if applicable, for repeater hub 707 to repeat (without buffering) for high speed bus controller 742. Low speed bus agent 702b in due course, also provides the response packets, if applicable, for repeater hub 711 to repeat (without buffering) for low speed bus controller 744. Low speed bus agent 702a in due course.provides the response packets, if applicable, to SF hub 104". Each of the response packets is provided in the slower communication speed with which low speed bus agent 702 operates. SF hub 104" buffers the response packets, and in turn, causes the response packets to be returned to high speed bus controller 742, in bulk, using the faster communication speed, upon accumulating some or all of the response packets due. Device driver 408 employs queries 724 and instructions 726 as described earlier to cause SF hub 104" to return the response packets in bulk. Additionally, device driver 708 practices the above described self-regulating manner of operation, and the streamlined approach to receiving responses.

Thus, for hybrid peripheral bus 700, the lower communication speed of bus agent 402a is bridged, eliminating the need for all the bus elements to speed shift to accommodate the lower communication speed of bus agent 702a, when switching from transactions with another peripheral device that is capable of operating at the higher communication speed, such as bus agent 703. Yet, if desired, hybrid peripheral bus 700 permits low speed bus agent 702b to be accommodated within signaling domain 736. If desired, multiple communication speeds and speed shifting may even be practiced in signaling domain 736, while speed bridging is concurrently practiced between signaling domains 732 and 734.

Figure 8:
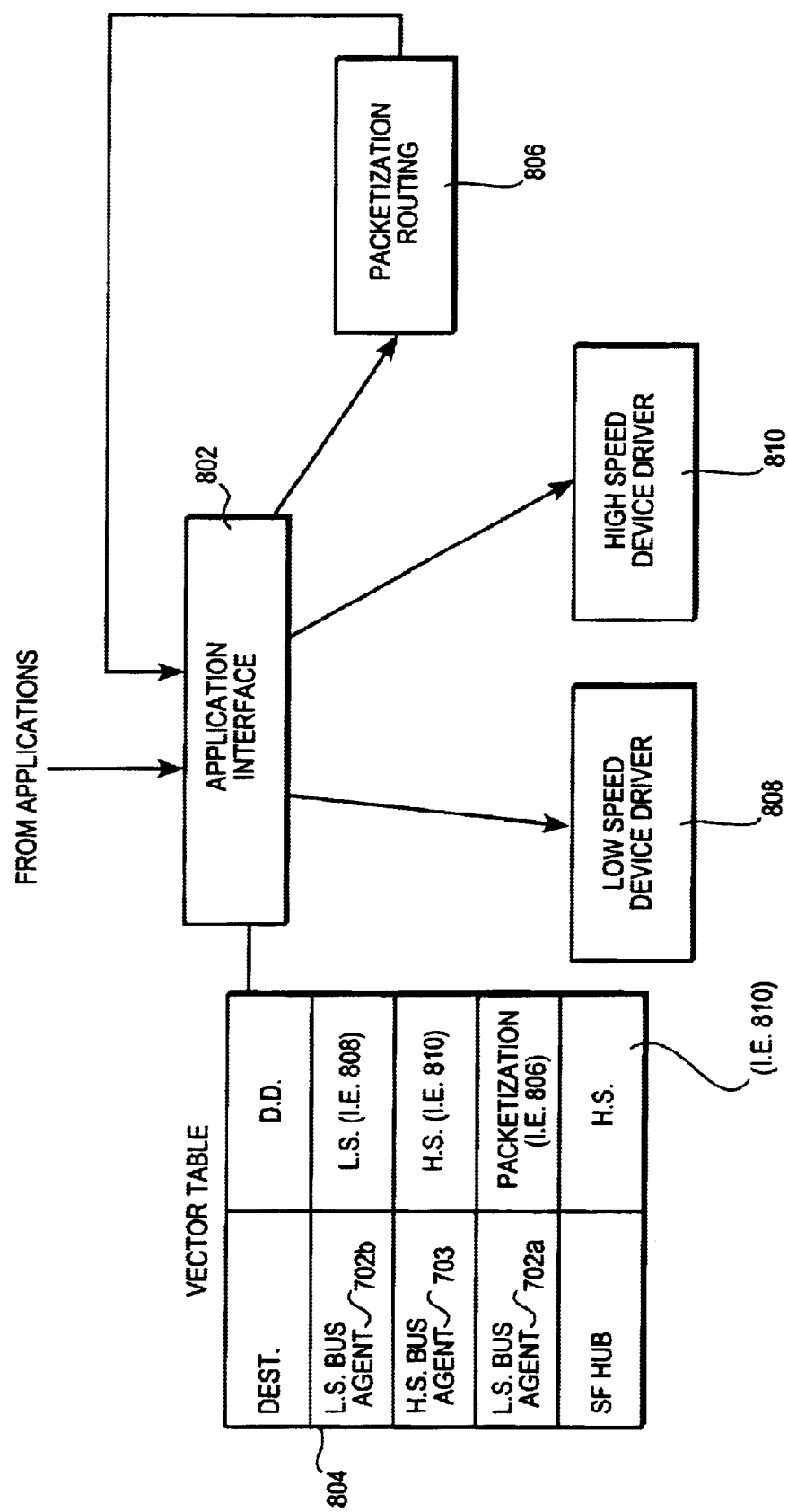
FIG. 8 illustrates the device driver for the hybrid bus controller of FIG. 7 in further detail, in accordance with one embodiment.

Referring now also to FIG. 8, wherein a block diagram illustrating one implementation of hybrid device driver 708, in accordance with one embodiment, is shown. As illustrated, for this embodiment, hybrid device driver 708 includes application interface 802, vector table 804, packetization routine 806, low speed device driver 808 and high speed device driver 810. Low speed device driver 808 and high speed device driver 810 perform the conventional scheduling and related functions of a device driver associated with a bus controller. Except for the employment of the earlier described task status field and response memory buffer identifiers, low speed device driver 808 and high speed device driver 810 are otherwise intended to represent a broad range of these bus controller device drivers known in the art.

Similarly, application interface 802 shields the operational details of device drivers 808–810 from an application needing to communicate with low speed bus agents 702a–702b and high speed bus agent 703. In response to a request to transmit communication or a transaction to high speed bus agent 703, application interface 802 (as specified by vector table 804) passes the request to high speed device driver 810, which in turn performs the packetization, scheduling and related functions as in the prior art. Similarly, in response to a request to transmit communication or a transaction to low speed bus agent 702b, application interface 802 (as specified by vector table 804) passes the request to low speed device driver 808, which also in turn performs the packetization, scheduling and related functions as in the prior art.

However, in response to requests to transmit communications or transactions to low speed bus agent 702a, application interface 802 (as specified by vector table 804) passes the request data to packetization routine 806, which packetizes the request data into multiple packets (with each packet having low speed bus agent 702a as the ultimate destination), as described earlier. Upon packetizing the request data, packetization routine 806 passes the request packets to application interface 802, in bulk, along with a global destination identifier identifying SF hub 104" as the destined recipient of the packetized data. Application interface 802 (as specified by vector table 804) passes the packetized package data, in bulk, to high speed device driver 810, which in turn performs the bulk packetization, scheduling and related functions as any other requests, treating the multiple packets as a single package.

In other words, by the novel employment of modified vector table 804 and packetization 806, the presence of the store-and-forward segment of the hybrid peripheral bus 700, and the details of its operations, are advantageously made transparent to the low speed and high speed device drivers 808 and 810.

Continuing to refer to FIG. 7, as the earlier described embodiments, the hybrid operation is substantially transparent to the applications. That is, from the perspective of the applications, it is merely handing off a block of data or requests to the device driver interface, without having to be cognizant of the different operating speeds of the various bus agents, and the manners through which they are attached to hybrid bus controller 706.

Again, while for ease of understanding, only bus agents 702a–702b and 703 are shown, those skilled in the art will appreciate that the present invention may be practiced with one or more hubs 704 and 711, supporting multiple levels of bus agents 702a–702b and 703. Furthermore, the present invention may also be practiced with bus agent 702a coupled to SF hub 104" through another conventional repeater type hub that operates at the slower communication speed. The conventional repeater type hub in turn may have one or more bus agents 702a attached to it. Likewise, bus agent 702b/703 may be coupled to repeater hub 711/707 through another repeater hub that operates at the slower/faster communication speed. The repeater hub in turn may have one or more bus agents 702b/703 attached to it.

Lastly, host system 710 is also intended to represent a broad range of digital systems, including but not limited to laptop computers, desktop computers, servers, set-top box, entertainment systems, and so forth.

Concluding Remarks

In general, those skilled in the art will recognize that the present invention is not limited by the details nor the embodiments described. Instead, the present invention may be practiced with modifications and alterations within the spirit and scope of the appended claims. The description is thus to be regarded as illustrative instead of restrictive on the present invention.

Thus, a digital system having a peripheral bus with at least one store-and-forward segment has been disclosed.

What is claimed is:

1. An article of manufacture comprising:
a recordable medium having recorded thereon a plurality of programming instructions for use to program a digital system having a bus controller, to enable the digital system to operate the bus controller to communicate with a first bus agent, by providing a plurality of request packets destined for the first bus agent, to a first hub, in an integrated multi-packet form in bulk at a first communication speed, for the first hub to first buffer the request packets and then forward the request packets to the first bus agent separately, on a packet-by-packet basis, at a second communication speed.

2. The article of manufacture claim 1, wherein the programming instructions include a first and a second subset that cooperate with each other to package said request packets into said integrated multi-packet form for said bus controller to transmit to said first hub, with the second subset shielding said multi-packet form organization from said first subset.

3. The article of manufacture claim 1, wherein the programming instructions further enable the digital system to operate the bus controller to query the first hub on whether some or all response packets to a request have been accumulated.

4. The article of manufacture of claim 1, wherein the first communication speed is faster than the second communication speed.

5. The article of manufacture of claim 1, wherein the first communication speed is slower than the second communication speed.

6. The article of manufacture of claim 1, wherein the programming instructions further enable the digital system to operate the bus controller to receive from the first hub, in bulk, response packets to a request, at said first communication speed.

7. The article of manufacture of claim 1, wherein the programming instructions further enable the digital system to operate the bus controller in a self-regulating manner, regulating total number of multi-packet packages provided to the first hub to buffer and forward to the first and other bus agents separately, on said packet-by-packet basis.

8. The article of manufacture of claim 1, wherein the programming instructions further enable the digital system to operate the bus controller to transmit communications destined for a second bus agent to the first hub, to which the second bus agent is also coupled, at said first communication speed, for the first hub to repeat the communications for the second bus agent without buffering, at also said first communication speed.

9. The article of manufacture of claim 1, wherein the programming instructions further enable the digital system to operate the bus controller to transmit communications destined for a second bus agent to a second hub, to which the second bus agent is coupled, at said second communication speed, for the second hub to repeat the communications for the second bus agent without buffering, at also said second communication speed.

10. The article of manufacture claim 3, wherein the programming instructions include a subset that automatically schedules/reschedules said query for bus controller to transmit to the first hub.

11. The article of manufacture of claim 7, wherein the programming instructions initially schedule selected ones of said request packets destined for the first and other bus agents in a not-ready state, which in turn are subsequently changed to ready request packets, as response packets to previously transmitted requests are received.

12. The article of manufacture of claim 9, wherein the programming instructions schedule said request packets in said multi-packet form in bulk, destined for said first bus agent, with a first portion of said bus controller equipped to operate in said first communication speed, and schedule said communications destined for said second bus agent with a second portion of said bus controller equipped to operate in said second communication speed.

13. The article of manufacture of claim 9, wherein the programming instructions further enable the digital system to configure a routing network of the bus controller to couple a first port of the bus controller, to which the first hub is attached, to a first control circuitry equipped to communicate:at said first communication speed, and to configure the routing network to couple a second port of the bus controller, to which the second hub is attached, to a second control circuitry equipped to communicate at said second communication speed.

14. The article of claim 13, wherein said programming instructions further enable the digital system to determine whether said routing circuitry is to be configured to couple each of the first and second ports to the first or the second control circuitry, upon detection of the attachment of the first and second bus agents to the first and second ports respectively.

15. The article of claim 14, wherein said programming instructions further enable the digital system to operate the bus controller to engage in a predetermined signaling protocol to determine the communication speed capabilities of the first and second bus agents, the predetermined signaling protocol including initial unconditional signaling at said faster first communication speed for a predetermined period of time.

16. A bus controller comprises a first portion to facilitate communication with a first hub of a first signaling domain with a first signaling rate, and a first bus agent of the first signaling domain or a second bus agent of a second signaling domain with a second signaling rate, with the first hub bridging signaling rate differentials between the first and the second signaling domain; and a second portion to facilitate communication with a third bus agent through a second hub, both of a third signaling domain with the same second signaling rate.

17. The bus controller of claim 16, wherein the bus controller further includes a first and a second port, and a routing network to selectively couple each of the first and the second port to either the first or the second portion of the bus controller.

18. The bus controller of claim 17, wherein said first portion further determines whether said routing network is to be configured to couple each of the first and second ports to the first or the second portion, upon detection of the attachment of the first and second hubs to the first and second ports respectively.

19. The bus controller of claim 18, wherein said first portion further engages in a predetermined signaling protocol to determine the communication speed capabilities of the first and the second hub, the predetermined signaling protocol including initial unconditional signaling at said faster first communication speed for a predetermined period of time.

20. The bus controller of claim 18, wherein each of said first and second ports includes a first and a second manner of electrical termination to be selectively configured depending on whether the port is to be coupled to the first or the second portion of the bus controller.

21. A method comprising:

a first routine providing request data destined for a first bus agent to a second routine;

the second routine processing the request data into a multi-packet package destined for a first hub, and returning the multi-packet package to the first routine; and the first routine providing the multi-packet package to a third routine to schedule for transmission to the first hub at a first communication speed, for the first hub to buffer the multi-packet package and forward the packets separately, on a packet-by-packet basis, to the first bus agent at a second communication speed.

22. The method of claim 21, wherein the method further comprises the third routine scheduling queries to be transmitted to the first hub to query the first hub on whether the first hub have received some or all response packets to a request.

23. The method of claim 21, wherein the first communication speed is faster than the second communication speed.

24. The method of claim 21, wherein the method further comprises the first routine providing communications destined to a second bus agent to the third routine to schedule for transmission to the first hub at said first communication speed, for the first hub to repeat without buffering to the second bus agent at also said first communication speed.

25. The method of claim 21, wherein the method further comprises the first routine providing communications destined to a second bus agent to a fourth routine to schedule for transmission to a second hub at said second communication speed, for the second hub to repeat without buffering to the second bus agent at also said second communication speed.

26. The method of claim 25, wherein the method further comprises the third routine configuring a routing network to couple a first port, to which the first hub is attached, to a first portion of a bus controller, and the third routine configuring the routing network to couple a second port, to which the second hub is attached, to a second portion of the bus controller.

27. The method of claim 26, wherein the method further comprises the third routine operating said first portion to determine whether said routing network is to be configured to couple each of the first and second ports to the first or the second portion, upon detection of the attachment of the first and second hubs to the first and second ports respectively.

28. The method of claim 27, wherein the method further comprises the third routine operating said first portion to engage in a predetermined signaling protocol to determine the communication speed capabilities of the first and the second hub, the predetermined signaling protocol including initial unconditional signaling at said faster first communication speed for a predetermined period of time.

29. The method of claim 28, wherein the method further comprises the third routine selectively configuring each of said first and second ports to employ one of a first and a second manner of electrical termination, depending on whether the port is to be coupled to the first or the second portion of the bus controller.

* * * * *